United States Patent [19]
Halls et al.

[11] 3,715,002
[45] Feb. 6, 1973

[54] SUBURBAN TRACTOR AND CONTROLS

[75] Inventors: Lawrence M. Halls, New Holland, Pa.; Shaun A. Seymour, Lebanon, Ohio

[73] Assignee: Sperry Rand Corporation, New Holland, Pa.

[22] Filed: Oct. 5, 1970

[21] Appl. No.: 78,138

[52] U.S. Cl. ................180/82, 180/111, 180/77 TC
[51] Int. Cl. ..........................................B60k 27/08
[58] Field of Search.........180/69 C, 77 TC, 89, 90.6, 180/82, 111

[56] References Cited

UNITED STATES PATENTS

| | | | |
|---|---|---|---|
| 2,740,487 | 4/1956 | Murty et al. | 180/69 C X |
| 2,931,452 | 4/1960 | Mackie | 180/69 C |
| 3,261,422 | 7/1966 | Jensen | 180/69 C |
| 3,329,229 | 7/1967 | Mukho | 180/77 TC |

*Primary Examiner*—Kenneth H. Betts
*Attorney*—Joseph A. Brown, John C. Thompson and James J. Kennedy

[57] ABSTRACT

A surburban tractor having a transmission control lever moveable between park and drive positions cooperatively related to a rear pivotable deck, a starter switch, and a parking lock. The control is so structured and orientated that when in the drive position the starter switch is open, the parking lock disengaged, and the rear deck is substantially prohibited from pivotable movement. In the park position the starter switch is closed, the parking lock engaged, and the rear deck is free to be pivoted.

3 Claims, 5 Drawing Figures

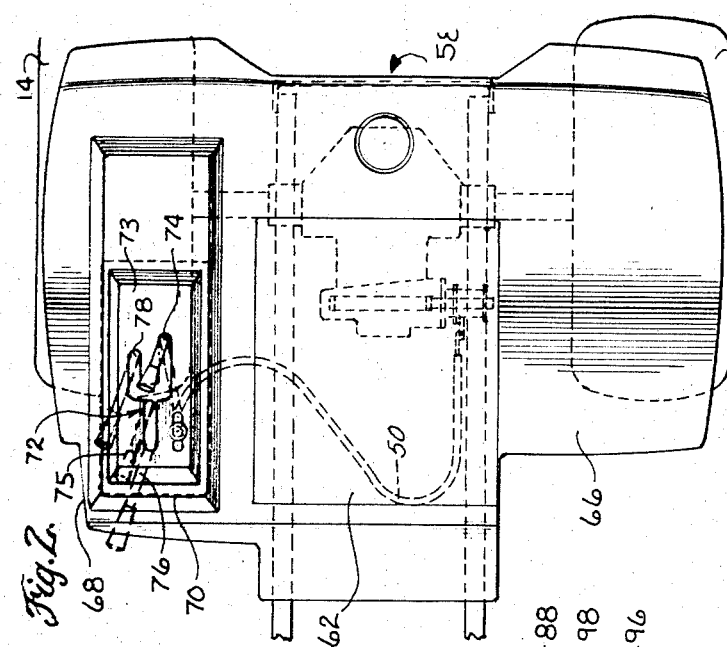
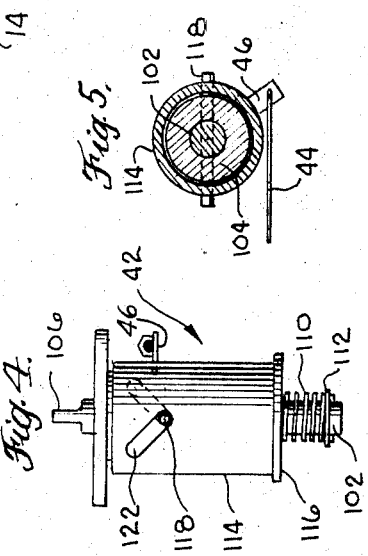
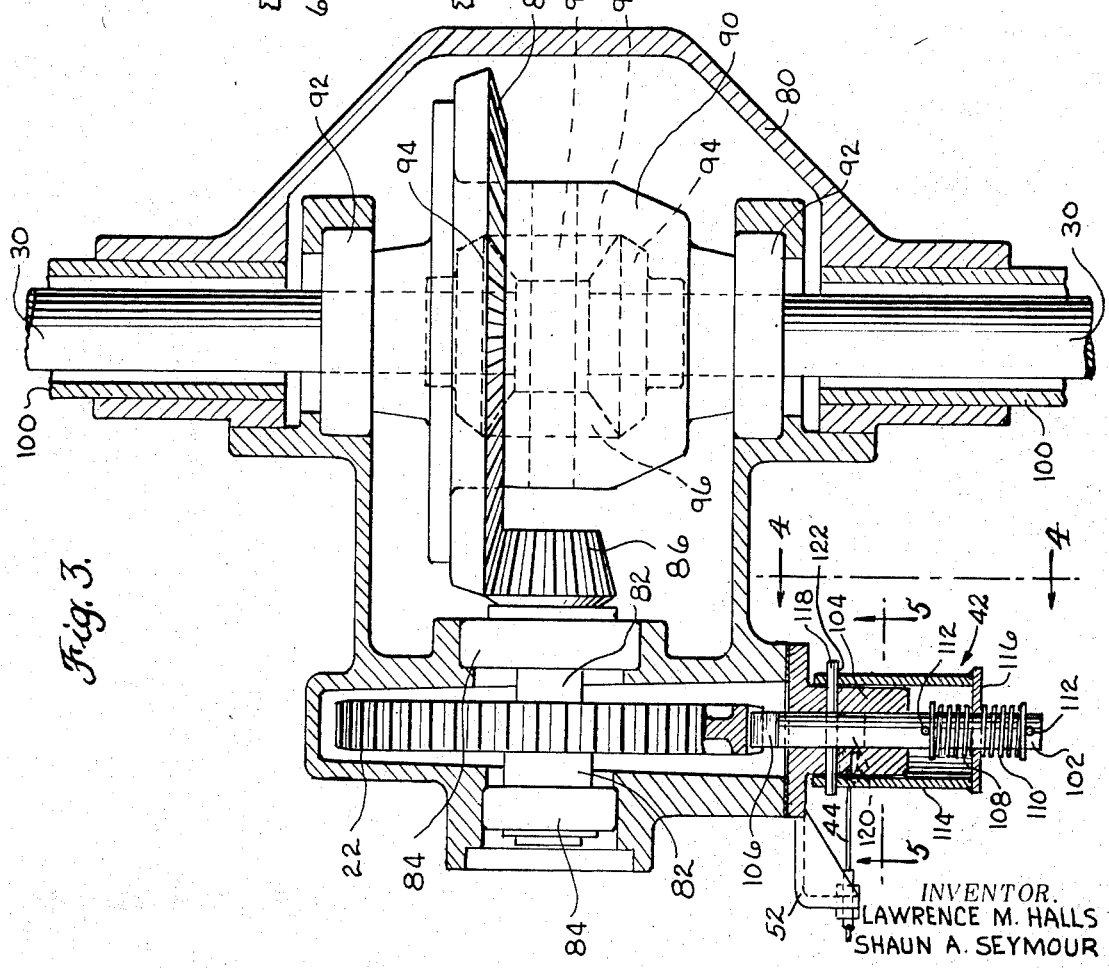

SUBURBAN TRACTOR AND CONTROLS

BACKGROUND OF INVENTION

This invention relates to suburban tractors and more particularly to a series of locking and precautionary devices used therein, and means for imposing and actuating these devices.

In the past a few suburban type tractors have employed rear pivotable decks in order that easy access may be gained to the transmission, rear end, and other drive components for servicing and repairing. In those tractors equipped with rear pivotable decks it has been necessary to place the operator's station atop the decks due to the limited area about the rear of the tractor. Since the deck pivots back and forth, it has been difficult to incorporate controls for the transmission and lift system within the deck and these controls have been mounted separately from the deck. The mounting of controls adjacent the deck is desirable because such controls are easy to reach and manipulate.

Also tractors of the prior art have included mechanisms cooperatively interconnected with the transmission control lever for locking the tractor when parked. The main disadvantage of the presently used parking locks is that they are quite complex and expensive to manufacture, the complexity and expense mainly being in the means for actuating the locking mechanism.

It is therefore an object of the present invention to provide a suburban tractor with a rear pivotable deck with the transmission and lift system control levers normally extending therethrough in close proximity to the operator.

Another object of the present invention is to provide means for interlocking the deck whereby it can only be pivoted when the transmission control lever is in park.

A further object of the present invention is to provide a parking lock mechanism having a simple, relatively inexpensive means for actuating.

Another object of the present invention to incorporate a series of simple, relatively inexpensive locking and precautionary devices into a suburban tractor and to provide a common means sensitive to the operative and inoperative modes of the tractor for actuating the locking and precautionary devices.

A more particular object of the present invention is to provide a suburban tractor having a starter switch and a parking lock cooperatively connected to a transmission control lever which is moveable between park and drive positions whereby the starter switch is open and the parking lock disengaged when the control lever is in the drive position and wherein the starter switch is closed and the parking lock engaged when the control lever is in the park position.

A further object of the present invention is to provide a spring loaded parking lock that is engageable with a gear that is drivenly connected to the rear wheels of the tractor.

Another object of the present invention is to provide a parking lock having a locking pin with spring means therearound, a housing rotatively disposed about the locking pin and engaged with the spring means, and means for urging the housing back and forth along the longitudinal axis thereof as rotated, whereby the longitudinal movement of the housing causes the spring means to be compressed, thereby biasing the locking pin for engagement with gear means drivenly connected to the rear wheels of the tractor.

DESCRIPTION OF THE DRAWINGS

FIG. 2 is a plan view, on a reduced scale, of the rear deck and transmission control lever.

FIG. 3 is a sectional view taken through the lines 3—3 of FIG. 1 showing the differential rear end, the locking gear thereof, and the parking lock in the locked or engaged position.

FIG. 4 is a detail view of the parking lock looking in the direction of the arrows 4—4 in FIG. 3.

FIG. 5 is a cross sectional view of the parking lock taken through the lines 5—5 of FIG. 3.

Figure 1:
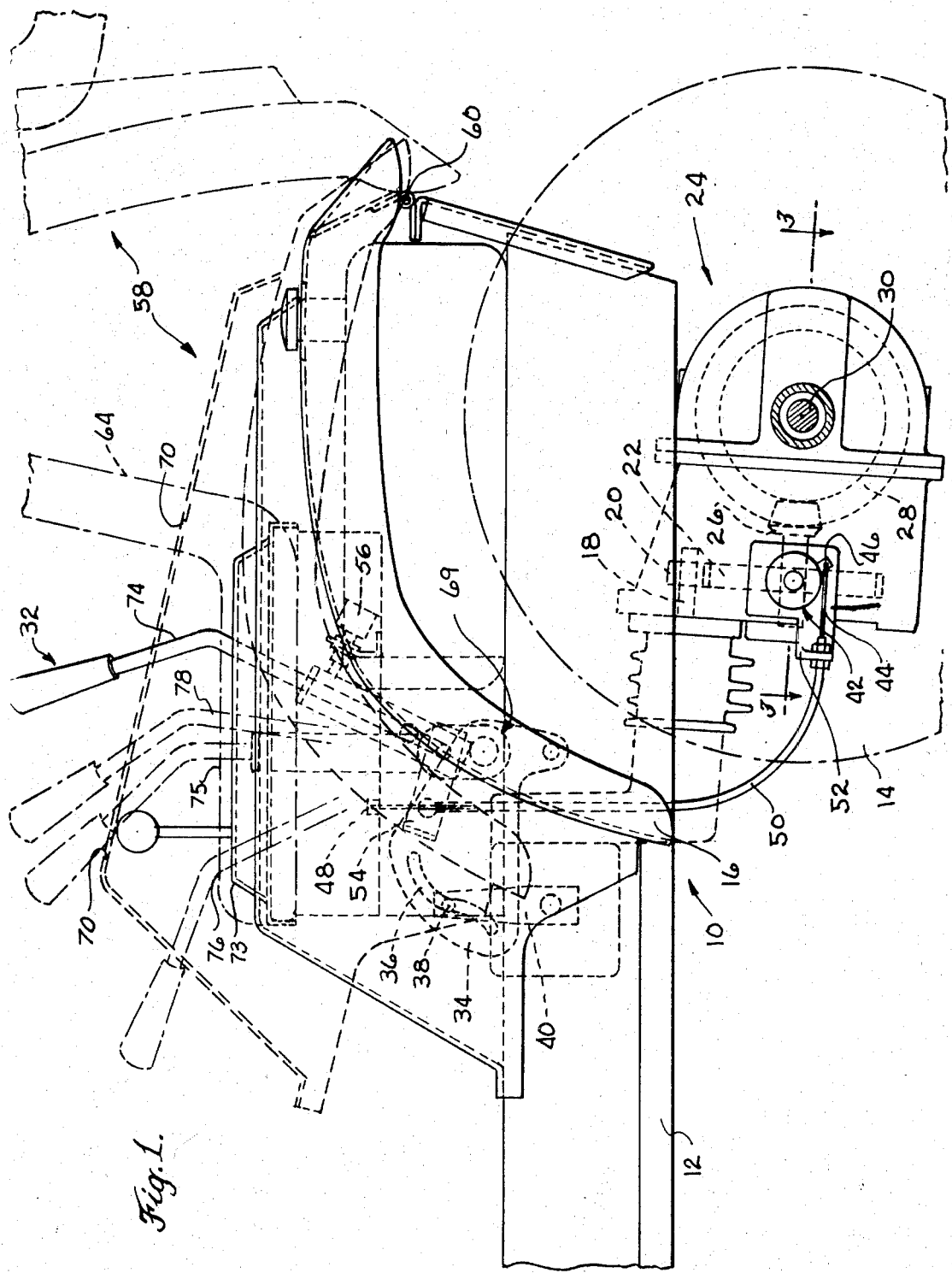
FIG. 1 is a side elevational view of the rear portion of the suburban tractor equipped with mechanisms constructed in accordance with the invention.

In the following description right-hand and left-hand reference is determined by standing to the rear of the tractor and facing the direction of travel.

DESCRIPTION OF PREFERRED EMBODIMENT

With reference to the drawings in detail, particularly FIG. 1, a suburban tractor is indicated generally by the numeral 10 and includes a longitudinal chassis 12 supported by wheel means 14. An internal combustion engine, not shown, is mounted forwardly on the tractor chassis 12 and is drivingly connected to a conventional hydrostatic transmission 16 having an output shaft 18 and a spur gear 20 affixed thereto. Spur gear 20 is meshed with a first reduction gear 22 of a differential rear end 24 which will be subsequently discussed in greater detail, but, in general, the differential rear end 24, as shown in FIG. 1, comprises a pinion gear 26 coaxially fixed to the reduction gear 22 and meshed with a ring gear 28 for driving left and right hand side axle shafts 30 which are, in turn, drivingly interconnected with the wheel means 14.

A control lever 32 extends upwardly adjacent the right-hand side of the chassis 12 and is moveable between park, neutral, forward, and reverse positions. Operatively connected to the control lever 32 is a cam plate 34 having a generally S-shaped arc 36 therein. Confined within the arc 36 is a stub shaft 38 fixed to a follower arm 40 which is connected to the hydrostatic transmission 16. The movement of the follower arm 40, as dictated by the control lever 32 and cam plate 34, determines both the direction and flow rate of fluid within the hydrostatic transmission 16, thereby controlling the speed and direction of the transmission output shaft 18.

Mounted outwardly along the left-hand side of the rear end 24, adjacent the reduction gear 22, is a cylindrical shaped parking lock mechanism 42. The housing 114 of the parking lock 42 is rotatable about the longitudinal axis thereof and is connected to a looped cable 44 by an ear 46. The looped cable 44 extends from the parking lock 42, transversely under the tractor chassis 12, and up to fixed point 48 about the right-hand side of the tractor 10 in close proximity to the control lever 32. Cable 44 is slidably contained within a cable housing 50 which is fixed about the lower end to bracket 52 and is attached at the upper end to a moveable arm 54 extending from the control lever 32. The bracket 52 generally extends from the park lock 42 and specifically is integrally formed with bushing 104 contained within the park lock, as best seen in FIG. 3. To actuate the parking lock 42, the cable housing 50 causes the cable 44 to be pushed rearwardly, rotating the parking lock counter clockwise. In similar manner, the movement of the housing 114 downwardly causes the cable 44 to be retracted rotating the parking lock 42 clockwise.

Continuing to refer to FIG. 1, a normally open micro switch 56 which is a part of the engine starting circuit, not shown, is particularly disposed for engagement with the control lever 32 when in the park position. The contact of the control lever 32 closes the micro switch, thereby permitting the engine to be started.

With reference to FIGS. and 2 a deck 58 is pivotally secured about a transverse axis 60 to the rear of chassis 12 and movable thereabouts from a normally horizontal position shown in solid lines of FIG. 1 to a vertical, upright position shown in phantom in FIG. 1. As best seen in FIG. 2, the deck 58 is generally includes a medial portion 62 substantially aligned with the chassis 12 and having an operator's seat 64 (shown in phantom in FIG. 1) fixed thereto. Extending outwardly from the medial portion 62, shielding the rear wheel means 14, are left and right fender portions 66,68 respectively. The front of the medial portion 62 is shaped into an inverted-U for snuggly fitting around the chassis 12 and is fixed thereto by clamp means, not shown.

A rectangular opening having a perimeter 70 is provided within the deck 58, intermediately of the medial portion 62 and the right-hand fender 68, for encompassing a rectangular mounting member 73 which is mounted to the right-hand side of chassis 12. A generally Y-shaped shifting slot 72 is provided within member 73 and confines control lever 32 therein. The control lever 32 is mounted about its lower end by a mounting structure indicated generally at 69 in FIG. 1 which permits the control lever to move forwardly and sidewardly within the Y-shaped shifting slot 72. As shown particularly in FIGS. 1 and 2 the control lever is moveable between a park position 74, neutral position 75, forward position 76, and a reverse position 78. Of particular significance is the angle and length of extension of the control lever 32 with respect to the perimeter 70 of the rectangular opening. Specifically, as seen in FIGS. 1 and 2, the control lever 32 is orientated such that in the forward, neutral, and reverse positions the upper end thereof lies in the pivotable path of the perimeter 70, thereby obstructing the pivotable movement of the entire deck 58. The deck as drawn in dotted lines of FIG. 1 shows this obstruction particularly.

Now turning to FIGS. 3, 4, and 5, the differential rear end 24 and parking lock mechanism 42 are shown in detail. The rear end 24 has a housing 80 mounted to the chassis 12 and is drivingly connected to the transmission 16 by the engagement of spur gear 20 with the first reduction gear 22 (FIG. 1). Referring to FIG. 3 particularly, a drive shaft 82 is co-axially secured to the reduction gear 22 and is journalled within bearings 84. Fixed to the rear end of shaft 84 is a pinion gear 86 meshed with a ring gear 88 which is fixed to a yoke-like carrier 90. The carrier 90 is rotatively journalled within carrier bearing 92 spaced to each side thereof. Disposed within the carrier 90 is a conventional differential comprised of a pair of side gears 94, each of which is drivingly connected to an axle shaft 30, and a pair of pinion gears 96 meshed between the side gears 94 and rotatable about a cross shaft 98, the axis of which extends normal to the axis of rotation of the side gears 94. Opposite ends of the cross shaft 98 are fixed to the carrier 90. Spacers 100 are interposed between the axle shafts 30 and the housing 80. Therefore as the carrier is rotated by t he ring gear 88, the pinion gears 96 are likewise rotated by the cross shaft 98, turning the side gears 94 and the axle shafts 30 in the process.

The parking lock mechanism 42 is mounted to the rear end housing 80, adjacent the reduction gear 22 and comprises an elongated locking pin 102 moveable along the longitudinal axis thereof within a bushing 104. The inward end of the locking pin 102 includes a blunted, tapered tip 106 for locking engagement with the teeth of the reduction gear 22. Biasing means in the forms of a pair of coil springs 108,110 are circularly disposed along a segment of the locking pin 102 in end to end relationship and confined therealong by stops 112. A cylindrical housing 114 is axially aligned with the locking pin 102 and rotatable about the bushing 104. The cylindrical housing 114 has a partition or outward end 116 interposed between the springs 108,110. Extending transversely through the cylindrical housing 114, bushing 104, and locking pin 102 is a cross shaft 118. The cross shaft 118 is fixed to the bushing 104 and extends through an open slot 120 along the longitudinal axis of the locking pin 102. Opposite ends of the cross shaft 118 are confined within axially slanted slots 122 of the cylindrical housing, shown particularly in FIG. 4. To rotate the cylindrical housing 114 about the bushing 104 an ear 46 is fixed to the housing and connected with the lower end of cable 44.

OPERATION

In order to start the tractor engine the control lever 32 must be in the park position such that the micro switch 56 (FIG. 1) is closed. This particular feature gives reasonable assurance that the tractor 10 will not be started when the transmission is in the forward, reverse, or even neutral position. But once the tractor 10 has been started and the control lever 32 has been moved from the park position (FIG. 2), the deck 58 cannot be pivoted upwardly from the normal horizontal position because the control lever 32 is so structured and oriented that it lies in the pivotable path of the perimeter 70 of the rectangular opening of the deck.

Once the tractor 10 has been stopped, the control lever 32 is placed in the park position indicated at 74 in FIG. 2. As seen in FIG. 1, the movement of the control lever 32 to the park position lifts the cable housing 50 upwardly with respect to the fixed point 48 of the cable 44. Since the cable housing 50 is looped and the lower end thereof is fixed within bracket 52, the upperward movement of the housing forces the cable 44 rearwardly out of the lower end of the housing, rotating the cylindrical housing 114 of the parking lock counter clockwise. As the cylindrical housing 114 is rotated counter clockwise, the presence of the fixed cross shaft 118 within the axially slanted slots 122 compels the housing to move inwardly toward the reduction gear 22 (FIGS. 3 and 4). The inward movement of the cylindrical housing 114 compresses the inward spring 108, biasing the locking pin 102 for locking engagement between a pair of teeth of reduction gear 22. It is possible that a single tooth may be aligned with the tip 106 of the locking pin 102 and prohibit locking engagement. Should this occur the tip 106 would immediately lodge between the aligned tooth and the next adjacent tooth with the slightest movement of the tractor 10 since the locking pin 102 would be biased inwardly. Once the tractor engine has been started, the movement of the control lever 32 from the park position to either the forward or reverse positions moves the cable housing 50 downwardly with respect to the fixed cable point 48. The downward movement of the cable housing 50 forces the cable 44 forwardly within the lower end of the cable housing, rotating the cylindrical housing 114 of the parking lock clockwise. The cylindrical housing 114 is compelled to move outwardly from the reduction gear 22 by the presence of the fixed cross shaft 118 within the axially slanted slots 122 as it is rotated clockwise. As the cylindrical housing 114 moves outwardly, the outer spring 110 is compressed, biasing the locking pin 102 outwardly for disengagement with the reduction gear 22. If the tractor 10 happens to be on an incline, the load on the reduction gear 22 may tend to prohibit the ejection of the locking pin 102 immediately upon movement of the control lever 32 from the park position. But once the control lever 32 is placed into gear the load is taken from the reduction gear 22 and the locking pin 102 is ejected therefrom since it is biased outwardly.

The terms, "upper," "lower," "forward," "rearward" etc., have been used herein merely for the convenience of the foregoing specification and in the appended claims to describe the present invention and its parts as orientated in the drawings. It is to be understood, however, that these terms are in no way limiting since the invention may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described the invention, what is claimed is:

1. In a tractor having a chassis, axle means transversely journalled on said chassis and having wheel means rotatably mounted thereon, power means mounted on said chassis, a forward-reverse transmission drivingly interconnected between said power means and said axle means, a rear deck secured to said chassis and pivotally mounted about a transverse axis to swing between a generally horizontal position and a raised position, an upwardly extending transmission control lever mounted at its lower end on said chassis and having an upper end disposed above the rear deck when said rear deck is in its horizontal position, said control lever being moveable between park, neutral, forward and reverse positions; the improvement comprising disposing the mounting for the control lever below the rear deck, and providing an opening within the rear deck aligned with the control lever mounting and encompassing said control lever, the parts being so arranged and constructed that the rear deck may be swung from its horizontal position to a raised position above the upper end of the control lever only when said control lever is in its park position.

2. A tractor, as recited in claim 1, wherein said control lever extends through a shifting slot formed within a mounting member, said mounting member being spaced to align with the opening in said rear deck when said rear deck assumes the horizontal position.

3. A tractor, as recited in claim 2, wherein said mounting member, control lever, and the opening in said rear deck are offset to one side of the tractor, thereby providing convenient access to said control lever.

* * * * *